(12) United States Patent
Hsieh et al.

(10) Patent No.: US 9,250,380 B2
(45) Date of Patent: Feb. 2, 2016

(54) BACKLIGHT MODULE REFLECTIVE PLATE HAVING REFLECTIVE UNITS ARRANGED ALONG A CURVE

(71) Applicant: AU Optronics Corporation, Hsin-Chu (TW)

(72) Inventors: Shang-Wei Hsieh, Hsin-Chu (TW); Super Liao, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 15 days.

(21) Appl. No.: 14/337,537

(22) Filed: Jul. 22, 2014

(65) Prior Publication Data

US 2015/0029747 A1 Jan. 29, 2015

(30) Foreign Application Priority Data

Jul. 26, 2013 (TW) .............................. 102126949 A

(51) Int. Cl.
*F21V 8/00* (2006.01)

(52) U.S. Cl.
CPC ............ *G02B 6/0055* (2013.01); *G02B 6/0031* (2013.01); *G02B 6/0051* (2013.01); *G02B 6/0053* (2013.01)

(58) Field of Classification Search
CPC .. G02B 6/0033; G02B 6/0031; G02B 6/0025; G02B 6/0053; G02B 6/0045; G02B 6/005; G02B 6/0055; G02B 6/0051
See application file for complete search history.

(56) References Cited

U.S. PATENT DOCUMENTS

| | | | | |
|---|---|---|---|---|
| 6,749,313 B2* | 6/2004 | Ludwig | .................. | G02B 6/005 362/340 |
| 8,212,962 B2* | 7/2012 | Rocard | .............. | B29D 11/0074 349/62 |
| 8,783,898 B2* | 7/2014 | Coleman | .................. | F21S 8/04 362/223 |
| 2006/0013017 A1 | 1/2006 | Yu et al. | | |
| 2010/0289983 A1 | 11/2010 | Rocard et al. | | |
| 2014/0111974 A1* | 4/2014 | Choi | ........................ | G09G 9/30 362/97.1 |

FOREIGN PATENT DOCUMENTS

| | | |
|---|---|---|
| CN | 101886785 | 11/2010 |
| TW | M318136 | 9/2007 |
| TW | 201202770 | 1/2012 |

* cited by examiner

*Primary Examiner* — Robert May
(74) *Attorney, Agent, or Firm* — WPAT, PC; Justin King

(57) ABSTRACT

A backlight module includes a light guide plate, at least one light source, and a reflective plate. The light source is configured for emitting light toward the light guide plate. The reflective plate has a plurality of reflective units arranging along a curved direction. Each of the reflective units includes a body and a plurality of microstructures. The body has a main surface facing the light guide plate. The plurality of microstructures are disposed on the main surface of the body. Each of the microstructures has a reflective surface. A first angle is included between the reflective surface of each of the microstructures and the main surface of the body. The first angles of the microstructures in one reflective unit are different from the first angles of the microstructures in an adjacent reflective unit.

15 Claims, 4 Drawing Sheets

BACKLIGHT MODULE REFLECTIVE PLATE HAVING REFLECTIVE UNITS ARRANGED ALONG A CURVE

RELATED APPLICATIONS

This application claims priority to Taiwan Application Serial Number 102126949, filed Jul. 26, 2013, which is herein incorporated by reference.

BACKGROUND

1. Field of Invention

The present invention relates to a backlight module.

2. Description of Related Art

In order to achieve uniform illumination, microstructures are disposed on reflective plates of most of the general backlight modules. The light-emitting direction of such microstructures is generally perpendicular to the tangent planes of the light guide plates so as to optimize the illumination of flat-type backlight modules. However, for a curved backlight module, uneven brightness tends to occur on both sides of the backlight module as viewed along the orthogonal direction when the microstructures are included. The reason is that the light-emitting direction of such type of microstructures is still perpendicular to the tangent plane of the light guide plate.

SUMMARY

A backlight module is provided. The backlight module includes a light guide plate, at least one light source, and a reflective plate. The light source is configured for emitting light toward the light guide plate. The reflective plate has a plurality of reflective units arranging along a curved direction. Each of the reflective units includes a body and a plurality of microstructures. The body has a main surface facing the light guide plate. The microstructures are disposed on the main surface of the body. Each of the microstructures has a reflective surface. A first angle is included between the reflective surface of each of the microstructures and the main surface of the body. The first angles of the microstructures in one reflective unit are different from the first angles of the microstructures in an adjacent reflective unit.

In one or more embodiments, each of the reflective units has a tangent plane to a center point of the main surface of the body of each reflective unit. A second angle is included between each tangent plane of each reflective unit and the tangent plane of the reflective unit located in the center of the reflective plate. The second angles for the reflective units are from about 0 degree to about 40 degrees. The first angles of the microstructures of the reflective units are from about 12 degrees to about 40 degrees.

In one or more embodiments, the second angle for one of the reflective units is from about 0 degree to about 5 degrees. The first angles of the microstructures of the one of the reflective units are from about 30 degrees to about 40 degrees.

In one or more embodiments, the second angle for one of the reflective units is from about 5 degrees to about 15 degrees. The first angles of the microstructures of the one of the reflective units are from about 25 degrees to about 35 degrees.

In one or more embodiments, the second angle for one of the reflective units is from about 15 degrees to about 20 degrees. The first angles of the microstructures of the one of the reflective units are from about 22 degrees to about 32 degrees.

In one or more embodiments, the second angle for one of the reflective units is from about 20 degrees to about 25 degrees. The first angles of the microstructures of the one of the reflective units are from about 20 degrees to about 30 degrees.

In one or more embodiments, the second angle for one of the reflective units is from about 25 degrees to about 35 degrees. The first angles of the microstructures of the one of the reflective units are from about 15 degrees to about 25 degrees.

In one or more embodiments, the second angle for one of the reflective units is from about 35 degrees to about 40 degrees. The first angles of the microstructures of the one of the reflective units are from about 12 degrees to about 22 degrees.

In one or more embodiments, the main surface of the body of each of the reflective units is a concave surface.

In one or more embodiments, the main surface of the body of each of the reflective units is a convex surface.

In one or more embodiments, a number of the at least one light source is two. The two light sources are respectively disposed at two ends of the light guide plate.

In one or more embodiments, the backlight module has a center plane. The light sources are substantially symmetrical about the center plane. The reflective surfaces of the microstructures is disposed between the center plane and one of the two light sources face the one of the two light sources.

In one or more embodiments, a shape of each of the microstructures is a pyramid.

In one or more embodiments, the backlight module further includes a diffusion plate. The light guide plate is disposed between the diffusion plate and the reflective plate.

In one or more embodiments, the backlight module further includes a prism sheet. The diffusion plate is disposed between the prism sheet and the light guide plate.

DETAILED DESCRIPTION

Figure 1:
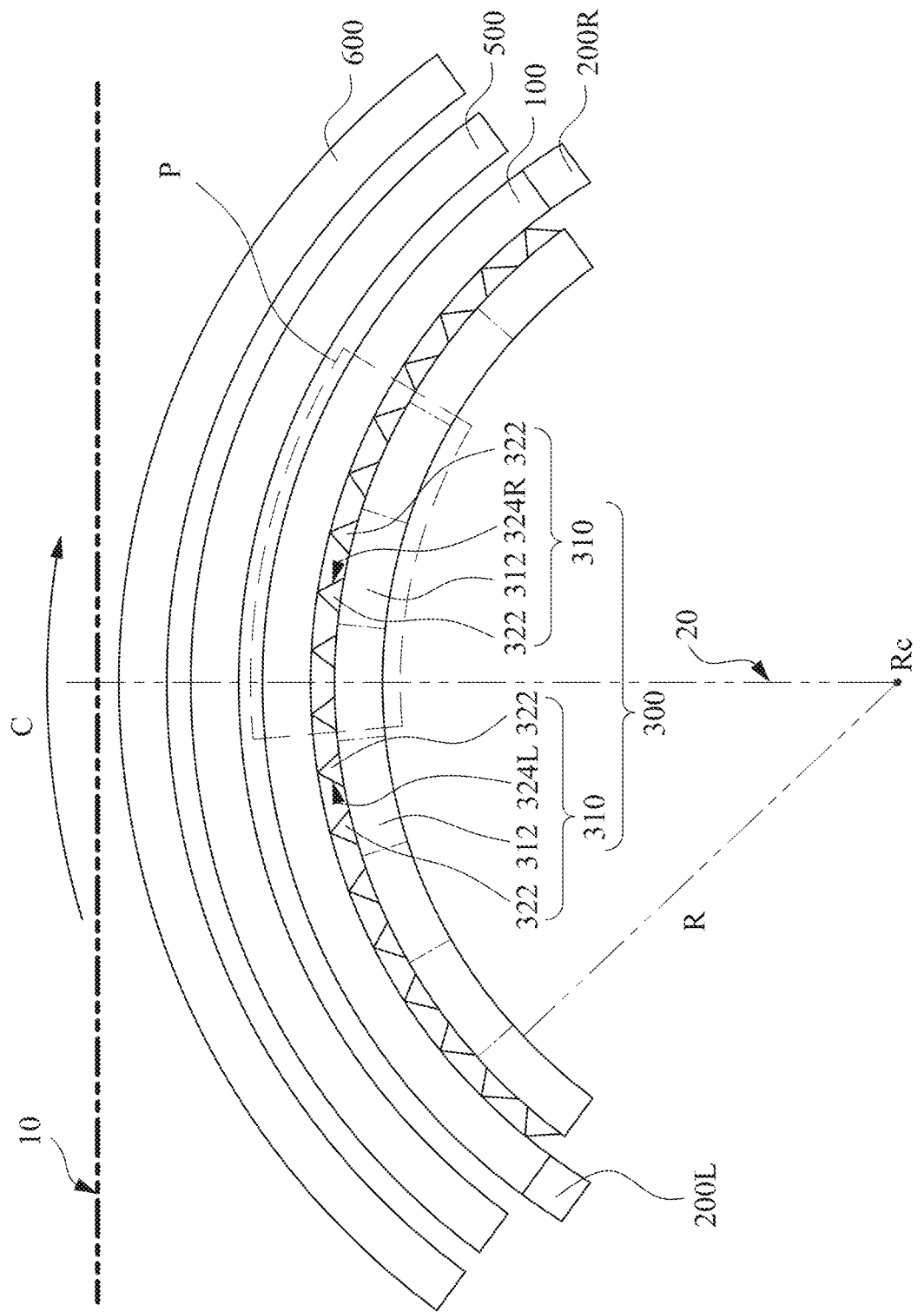
FIG. 1 is a cross-sectional schematic view of a backlight module according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

The practical details of the invention will be described as follows, however, it should be understood that such description is only to illustrate and not to limit the scope of the invention. That is, in some embodiments of the invention, the practical details are not necessary. In addition, known structures and components are depicted schematically in the drawings.

In typical flat-type backlight modules, microstructures therein are disposed to change directions of light traveling so as to allow light to emit from the light-emitting surfaces along orthogonal directions (that is the normal directions to the light-emitting surfaces). However, for a curved backlight module, uneven brightness occurs on both sides of the backlight module when viewed along the orthogonal direction if light emits from the light-emitting surface along the orthogonal direction. FIG. 1 is a cross-sectional view of a backlight module according to one embodiment of this invention. According to the present embodiment, a first angle θ1 (see FIG. 2) of each of microstructures 322 of each of reflective units 310 in the backlight module may be adjusted as required by practical situations. In this manner, most of the light emitted from a light source 200L and a light source 200R is reflected to a same viewing plane 10 so as to improve the above-mentioned problem of uneven brightness.

As shown in FIG. 1, the backlight module includes a light guide plate 100, at least one light source, and a reflective plate 300. For example, the backlight module may include the two light sources 200L, 200R in the present embodiment. However, the present invention is not limited in this regard. The light sources 200L and 200R are configured for emitting light toward the light guide plate 100. The reflective plate 300 is divided into a plurality of reflective units 310 arranging along a curved direction C. Each of the reflective units 310 includes a body 312 and a plurality of the microstructures 322.

Figure 2:
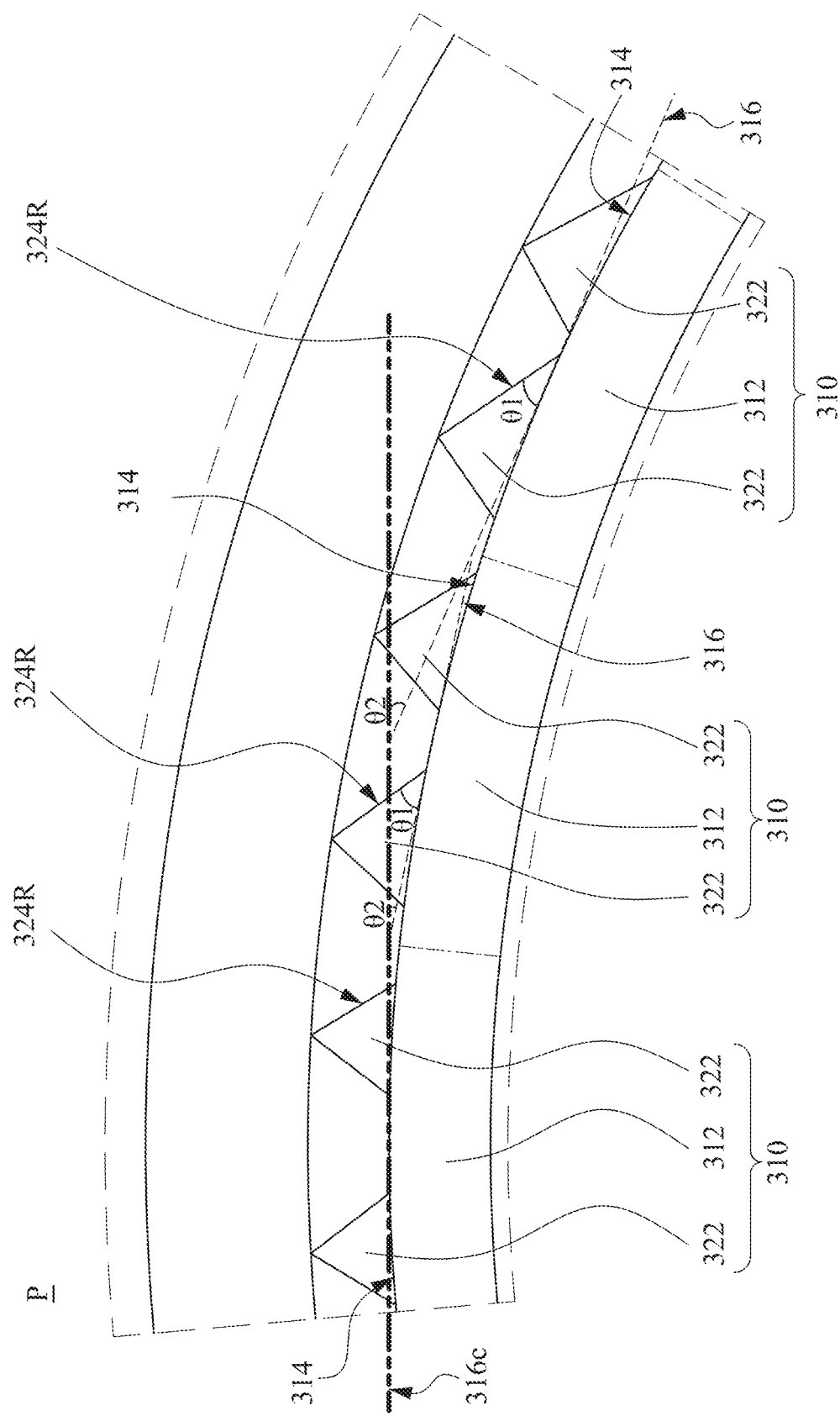
FIG. 2 is an enlarged view of an area P in FIG. 1.

Reference is made to FIG. 2 which is an enlarged view of an area P in FIG. 1. By continuing with the above description, each of the bodies 312 has a main surface 314 facing the light guide plate 100. The microstructures 322 are disposed on the main surface 314 of each of the bodies 312. Each of the microstructures 322 has a reflective surface 324R (or 324L, as indicated in FIG. 1). The first angle θ1 is included between the reflective surface 324R (or 324L) of each of the microstructures 322 and the main surface 314 of the corresponding body 312. The first angles θ1 of the microstructures 322 in the two adjacent reflective units 310 are different from each other. That is, the first angles θ1 of the microstructures 322 in the same reflective unit 310 are the same, but the first angles θ1 of the microstructures 322 in the two adjacent reflective units 310 are different from each other. In one variant embodiment, the first angles θ1 of the plurality of microstructures 322 in each of the reflective units 310 can be different.

Reference is made to FIG. 1. In one or more embodiments, the light sources 200L and 200R may be respectively disposed at two ends of the light guide plate 100 along the curved direction C to facilitate the design of each of the first angles θ1 (as indicated in FIG. 2). With such a configuration, the reflective surface 324L or the reflective surface 324R of each of the microstructures 322 may be disposed in such a manner so that the reflective surfaces 324L and the reflective surfaces 324R respectively face the adjacent light source 200L and light source 200R to guide light to the viewing plane 10 more efficiently. The backlight module has a center plane 20. The center plane 20 is substantially orthogonal to the viewing plane 10, and the light sources 200L and 200R are substantially symmetrical about the center plane 20. In FIG. 1, each device or feature on the left side of the center plane 20 is defined as the device or feature in the left half part, and each device or feature on the right side of the center plane 20 is defined as the device or feature in the right half part. Hence, all the reflective surfaces 324L of the microstructures 322 in the left half part face the light source 200L on the left side so as to guide the light emitted from the left-sided light source 200L to the viewing plane 10. All the reflective surfaces 324R of the microstructures 322 in the right half part face the light source 200R on the right side so as to guide the light emitted from the right-sided light source 200R to the viewing plane 10.

Reference is mad to FIGS. 1 and 2. The reflective unit 310 located in the center of the reflective plate 300 has a tangent plane 316c to a center point of the main surface 314 of the body 312 of the center reflective unit 310. The tangent plane 316c is substantially in parallel with the viewing plane 10. Each of the reflective units 310 other than the center reflective plate 300 has a tangent plane 316 to a center point of the main surface 314 of the body 312 of each of the reflective units 310 other than the center reflective plate 300. A second angle θ2 is included between each of the tangent planes 316 of the bodies 312 and the tangent plane 316c or between each of the tangent planes 316 of the bodies 312 and the viewing plane 10. The second angles θ2 in the two adjacent reflective units 310 are different from each other. In greater detail, the value of each of the second angles θ2 reflects the degree of bending of each of the reflective units 310 relative to the body 312 of the reflective unit 310 in the center of the reflective plate 300. Hence, a range of the first angles θ1 for each of the reflective units 310 can be derived from the second angle θ2 of the same reflective unit 310. In this manner, each of the microstructures 322 is able to guide light emitted from the light source 200L or 200R to the viewing plane 10. In other words, when the degree of bending of the reflective unit 310 is varied, the first angles θ1 of the microstructures 322 corresponding to the reflective unit 310 will also be varied. Their relationship is shown in Table 1:

TABLE 1 relation table between the second angle θ2 and the first angle θ1.

| The second angle θ2 | The first angle θ1 |
| --- | --- |
| about 0°~about 5° | about 30°~about 40° |
| about 5°~about 10° | about 25°~about 35° |
| about 10°~about 15° | about 25°~about 35° |
| about 15°~about 20° | about 22°~about 32° |
| about 20°~about 25° | about 20°~about 30° |
| about 25°~about 30° | about 15°~about 25° |
| about 30°~about 35° | about 15°~about 25° |
| about 35°~about 40° | about 12°~about 22° |

By way of the relationships set forth in Table 1, each of the microstructures 322 can be configured to allow most light to be reflected toward the viewing plane 10. For example, the reflective unit 310 in the center of the reflective plate 300 has the second angle θ2 equal to 0 degree, the selectable range of the first angles θ1 of the microstructures 322 corresponding to the reflective unit 310 in the center of the reflective plate 300 is thus from about 30 degrees to about 40 degrees. The range of the first angles θ1 of each of the reflective units 310 other than the reflective unit 310 in the center of the reflective plate 300 may be appropriately selected based on a range of the second angle θ2 of the same reflective unit 310.

A description of designing of the reflective surfaces 324L and the reflective surfaces 324R of the above-mentioned microstructures 322 is provided in the following embodiment with reference to FIG. 1 and FIG. 2. Taking the backlight module having a radius of curvature R of 180 millimeters as an example, the angle between the tangent plane 316 of the reflective unit 310 located at the outmost edge of the reflective plate 300 and the tangent plane 316c is about 35 degrees. Under the circumstances, the right half part of the reflective plate 300 being divided into eight reflective units 310 serves as an example. The second angles θ2 of the reflective units 310 from the center to the rightmost edge of the backlight module are 0 degree, 5 degrees, 10 degrees, 15 degrees, 20 degrees, 25 degrees, 30 degrees, and 35 degrees sequentially. The first angle θ1 and the second angle θ2 corresponding to each of the reflective units 310 are shown in Table 2:

TABLE 2 the relation table between the second angle θ2 and the first angle θ1.

| The second angle θ2 | The first angle θ1 |
| --- | --- |
| 0° | 36° |
| 5° | 33° |
| 10° | 29° |
| 15° | 28° |
| 20° | 26° |
| 25° | 22° |
| 30° | 20° |
| 35° | 18° |

Figure 3:
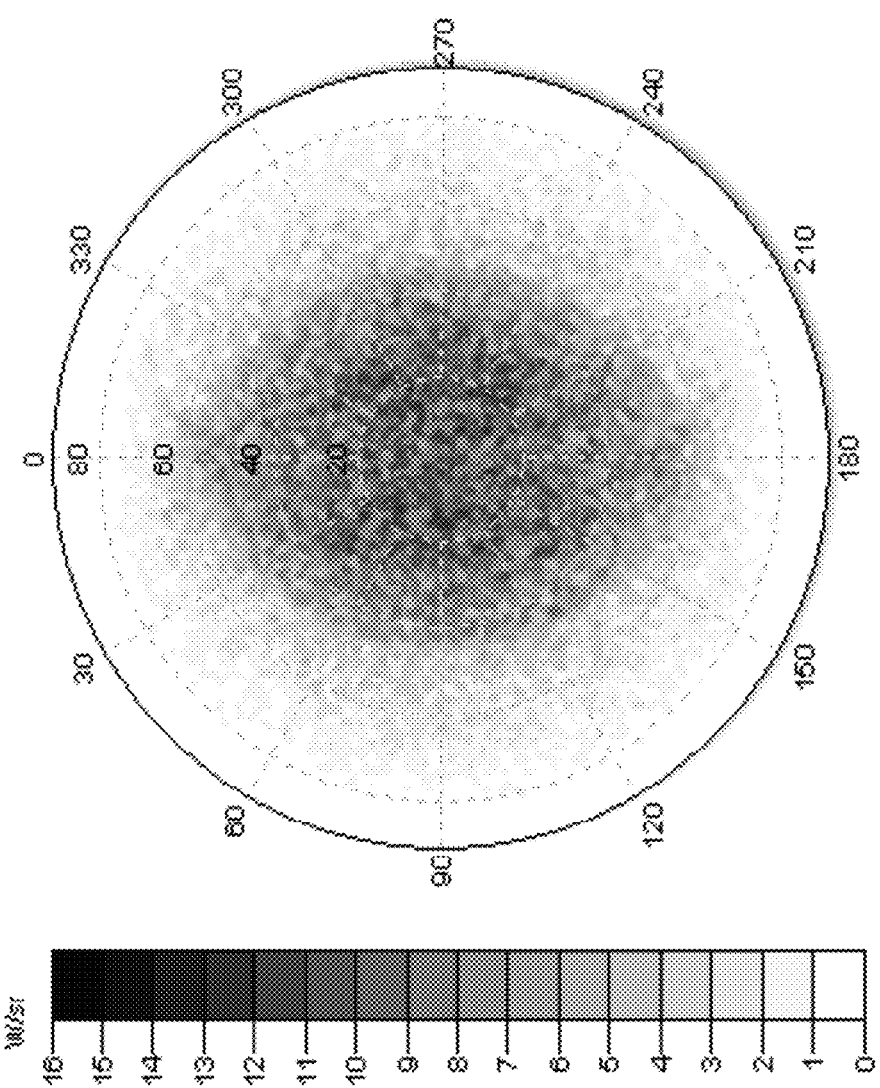
FIG. 3 is an optical field distribution on a viewing plane according to one embodiment of this invention.

The reflective surfaces 324R and the reflective surfaces 324L of the microstructures 322 respectively in the right half part and left half part are thus designed based on the data in Table 2 to obtain the optical field distribution on the viewing plane 10 shown in FIG. 3. The coordinates on the circumference (0, 30, ..., 300, 330, unit: degree) define the viewing plane 10. The coordinates from 0 degree to 180 degrees represent the left half part of the viewing plane 10, and the coordinates from 180 degrees to 360 degrees (0 degree) represent the right half part of the viewing plane 10. The coordinates within the circumference (20, 40, 60, 80, unit: degree) represent the angles made with the viewing plane 10. For example, 0 degree represents the normal direction to the viewing plane 10. As illustrated in the optical field distribution, when the backlight module is configured with the parameters shown in Table 2, the viewing plane 10 has a wide optical filed distribution. In addition, the optical flux passing through the viewing plane 10 of the backlight module of the present embodiment is increased by 1.6 times as compared with the backlight module utilizing typical microstructures. It is thus evident that the brightness of the viewing plane 10 of the backlight module according to the present embodiment is more uniform when viewed along the orthogonal direction.

Reference is made to FIG. 1. In one or more embodiments, a shape of each of the microstructures 322 is a pyramid and one side of the pyramid serves as the reflective surface 324L (or 324R). However, the present invention is not limited in this regard. In other embodiments, the microstructures 322 may be in any shape as long as the value of the first angle θ1 (see FIG. 2) of each of the microstructures 322 can be set.

In one or more embodiments, the backlight module may further include a diffusion plate 500. The light guide plate 100 is disposed between the diffusion plate 500 and the reflective plate 300. By increasing the probabilities of light refraction, light reflection, and/or light scattering, the diffusion plate 500 will further facilitate the uniforming of light emitted from the light guide plate 100 to allow light to distribute on the viewing plane 10 more uniform.

In one or more embodiments, the backlight module may further include a prism sheet 600. The diffusion plate 500 is located between the prism sheet 600 and the light guide plate 100. Since light collimation slightly decreases after light is emitted from the diffusion plate 500, the prism sheet 600 is utilized for guiding the light traveling paths so as to increase the brightness of the backlight module. The prism sheet 600 may, for example, be constituted by a plurality of prisms. Under the circumstances, the prism sheet 600 is capable of collecting light and increasing brightness along the orthogonal direction by controlling light refraction and light reflection direction affected by the prism.

Figure 4:
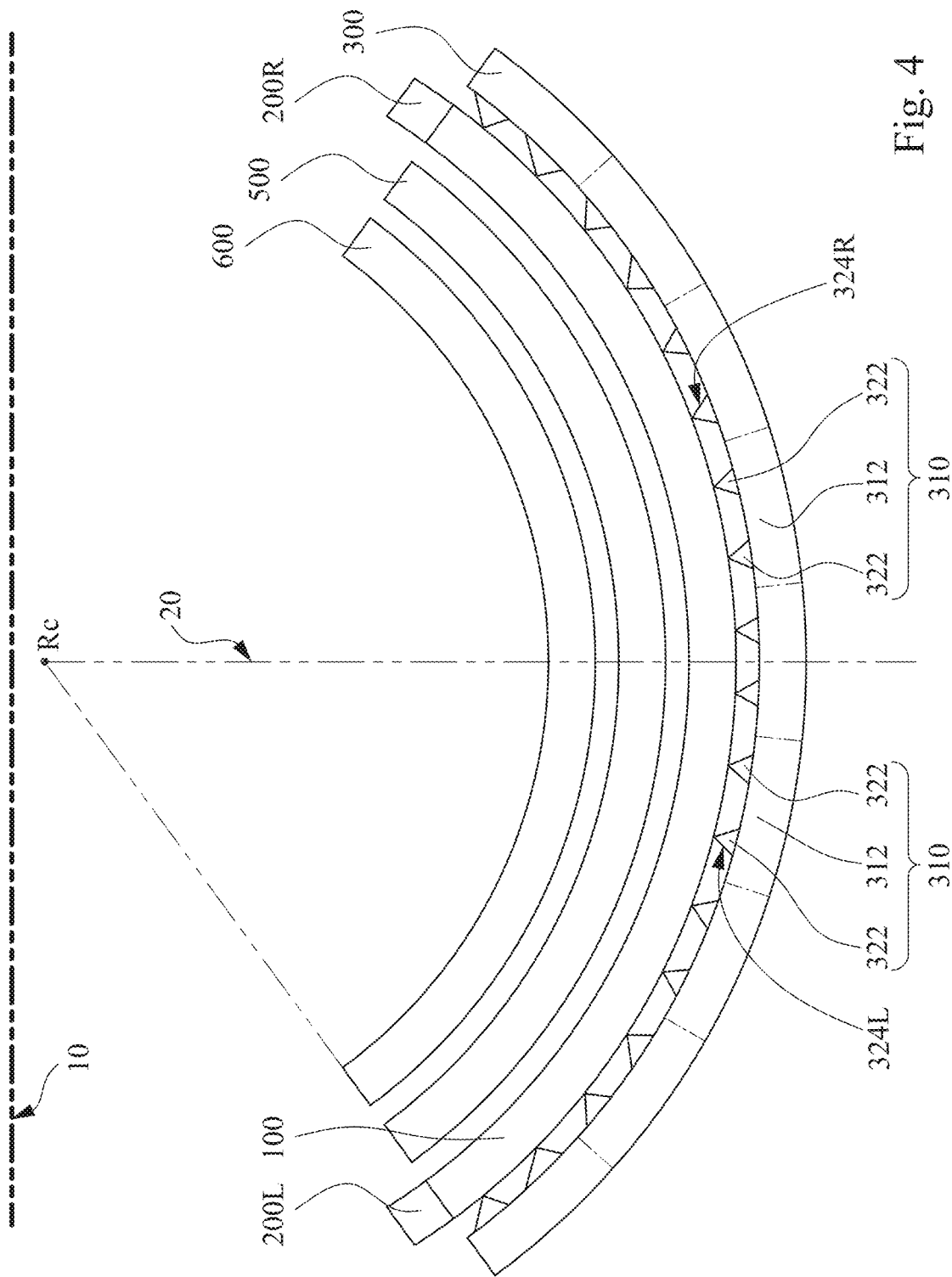
FIG. 4 is a cross-sectional schematic view of a backlight module according to another embodiment of this invention.

In the above-mentioned embodiments, the viewing plane 10 is over the convex surface of the backlight module. In this manner, the main surface 314 of the body 312 of each of the reflective units 310 is a convex surface. In other words, the center of curvature Rc of the reflective plate 300 is located on one side of the reflective plate 300 opposite to the light guide plate 100. However, the present invention is not limited in this regard. FIG. 4 is a cross-sectional schematic view of a backlight module according to another embodiment of this invention. The backlight module according to the present embodiment differs from the backlight module shown in FIG. 1 in the position of center of curvature Rc. In the present embodiment, the viewing plane 10 is over the concave surface of the backlight module. In this manner, the main surface 314 of the body 312 of each of the reflective units 310 is a concave surface. In other words, the center of curvature Rc of the reflective plate 300 is located on one side of the reflective plate 300 that is the same side as the light guide plate 100. With such a configuration, each of the reflective surfaces 324L and the reflective surfaces 324R still faces the adjacent light source 200L and light source 200R, respectively. If the center plane 20 of the backlight module is taken as a boundary, all the reflective surfaces 324L of the microstructures 322 in the left half part face the light source 200L on the left side, and all the reflective surfaces 324R of the microstructures 322 in the right half part face the light source 200R on the right side. Hence, by employing the relationships shown in Table 1, the microstructures 322 of the backlight module according to the present embodiment are capable of increasing the optical flux passing through the viewing plane 10. Since other details and structures of the present embodiment are the same as those of the embodiment shown in FIG. 1, a further description in these regards is not provided.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
   a light guide plate;
   at least one light source configured for emitting light toward the light guide plate; and
   a reflective plate, the reflective plate having a plurality of reflective units arranging along a curved direction, each of the reflective units comprising:
      a body having a main surface facing the light guide plate; and
      a plurality of microstructures disposed on the main surface of the body, each of the microstructures having a reflective surface, a first angle included between the reflective surface of each of the microstructures and the main surface of the body,
   wherein the first angles of the microstructures in one reflective unit are different from the first angles of the microstructures in an adjacent reflective unit.

2. The backlight module of claim 1, wherein each of the reflective units has a tangent plane to a center point of the main surface of the body of each reflective unit, a second angle is included between each tangent plane of each reflective unit and the tangent plane of the reflective unit located in the center of the reflective plate, the second angles for the reflective units are from about 0 degree to about 40 degrees, and the first angles of the microstructures of the reflective units are from about 12 degrees to about 40 degrees.

3. The backlight module of claim 2, wherein the second angle for one of the reflective units is from about 0 degree to about 5 degrees, and the first angles of the microstructures of the one of the reflective units are from about 30 degrees to about 40 degrees.

4. The backlight module of claim 2, wherein the second angle for one of the reflective units is from about 5 degrees to about 15 degrees, and the first angles of the microstructures of the one of the reflective units are from about 25 degrees to about 35 degrees.

5. The backlight module of claim 2, wherein the second angle for one of the reflective units is from about 15 degrees to about 20 degrees, and the first angles of the microstructures of the one of the reflective units are from about 22 degrees to about 32 degrees.

6. The backlight module of claim 2, wherein the second angle for one of the reflective units is from about 20 degrees to about 25 degrees, and the first angles of the microstructures of the one of the reflective units are from about 20 degrees to about 30 degrees.

7. The backlight module of claim 2, wherein the second angle for one of the reflective units is from about 25 degrees to about 35 degrees, and the first angles of the microstructures of the one of the reflective units are from about 15 degrees to about 25 degrees.

8. The backlight module of claim 2, wherein the second angle for one of the reflective units is from about 35 degrees to about 40 degrees, and the first angles of the microstructures of the one of the reflective units are from about 12 degrees to about 22 degrees.

9. The backlight module of claim 1, wherein the main surface of the body of each of the reflective units is a concave surface.

10. The backlight module of claim 1, wherein the main surface of the body of each of the reflective units is a convex surface.

11. The backlight module of claim 1, wherein a number of the light source is two, and the two light sources are respectively disposed at two ends of the light guide plate.

12. The backlight module of claim 11, wherein the backlight module has a center plane, the light sources are substantially symmetrical about the center plane, and the reflective surfaces of the microstructures is disposed between the center plane and one of the two light sources face the one of the two light sources.

13. The backlight module of claim 1, wherein a shape of each of the microstructures is a pyramid.

14. The backlight module of claim 1, further comprising a diffusion plate, and the light guide plate being disposed between the diffusion plate and the reflective plate.

15. The backlight module of claim 14, further comprising a prism sheet, the diffusion plate being disposed between the prism sheet and the light guide plate.

* * * * *